Aug. 29, 1961     E. JAULMES     2,998,471
INTERNAL COMBUSTION MOTOR WITH BUILT IN IGNITION DEVICE
Filed Nov. 25, 1957     2 Sheets-Sheet 2

INVENTOR
ERIC JAULMES

BY
*Irvin S. Thompson*
ATTORNEY

# United States Patent Office 2,998,471
Patented Aug. 29, 1961

2,998,471
INTERNAL COMBUSTION MOTOR WITH BUILT IN IGNITION DEVICE
Eric Jaulmes, Paris, France, assignor to Ateliers de la Motobecane, Société Anonyme Française, Paris, France
Filed Nov. 25, 1957, Ser. No. 698,485
Claims priority, application France Nov. 29, 1956
11 Claims. (Cl. 123—149)

In all motors, particularly small two-stroke motors, the presence of a flywheel magneto—the classical ignition device—increases the bulk in the longitudinal direction and complicates manufacture. The crankshaft is generally in two symmetrical parts and the motor comprises two opposite exits for the shaft, one of the shaft ends carrying the flywheel magneto and the other the pulley or the toothed pinion of the transmission.

In another form of construction, the crankshaft with a single crank arm is overhung but an external bridge supports the second bearing of the shaft, the flywheel magneto being placed outside this bridge. The power take-off, in these motors, is achieved by means of a friction roller mounted on the interior of the bridge.

The motor conceived in accordance with the present invention comprises at one and the same time a crank disc and a single shaft outlet for the transmission of power, this end of the shaft either carrying or not carrying a flywheel but the cumbersome bridge is replaced by an axial sleeve centered at the end of the exit shaft, and its generator for electrical ignition and lighting is incorporated in the casing and in the crank.

The axial bulk of a motor thus constructed is reduced to the minimum owing to the elimination of the ordinary flywheel magneto. If such a motor is used to drive an autocycle by friction on the tire, it represents a satisfactory and aesthetically pleasing distribution of the masses: on the one side of the wheel (and of the friction roller) there is the cylinder and the casing and on the other side of the wheel, the flywheel.

The general arrangement offers in addition some important advantages, of which some are already known:

(a) From the constructional point of view, the crankshaft only comprises a single arm, perhaps constituted by a simple disc bearing an eccentric pin. The delicate alignment of the two parts of the shafts, indispensible with crankshafts with two arms separated by the crank pin is dispensed with.

On the other hand, the casing may be made in a single piece and closed, at the opposite end to the exit of the shaft, by a simple thin cover of large dimensions of which the form will be such that the dead space of the casing will be reduced as far as possible.

Finally, a motor constructed in this way may comprise a single main bearing close to the crank. The opposite end of the shaft is supported by an auxiliary needle bearing, for example, that is light and less cumbersome, or even by a simple bearing. It thus becomes possible to give the casing such a form that its transverse sections diminish successively from its open end to the end of the sleeve through which the shaft emerges, that it constitutes a piece easily removed from a mould and of simple and economical manufacture.

(b) From the point of view of use the flywheel of a much lesser thickness than that of a flywheel magneto leads to a bulk which is less than that of motors at present known.

The magnetic masses which are incorporated in the crank are not thicker than the latter, so that one does not lose in the motor what one has gained as regards bulk in the flywheel.

The gain thus obtained in the axial bulk is particularly valuable in the small motors with friction rollers disposed in the neighborhood of the pedalling mechanism of autocycles, and of which they must not disturb the normal functioning.

Furthermore, according to the invention, the coils for ignition and lighting are directly mounted on the casing, externally to the latter, which ensures that they are well cooled and renders them very accessible. They are disposed radially and placed at the periphery of the casing.

The ignition device is divided into two distinct parts:

(1) The permanent magnet and its pole pieces, incorporated in the crank and constituting a part of the balance weight of the latter. The crank in rotating forms an arcuate air gap between the permanent magnet and the coils which is capable of being easily determined and with a very great degree of precision, since it depends on the centering of the crankshaft itself, which is bound to be very rigorous.

(2) The breaker, of standard construction, but conveniently placed on the end of the output shaft remote from the crank, is outside the air tight seal for the shaft and crank, so as to be easily accessible. It would, however, be possible, to give it a different location, for example directly on the casing, controlling it by an appropriate contact, mechanically connected to the crankshaft.

One may even provide a contact breaker under magnetic control or eliminate this element completely with an ignition device made to work in some similar manner.

As for the condenser, it could be mounted on the contact breaker, or in the neighbourhood of the latter, or furthermore, placed on the outside, on the casing, to be itself just as easily accessible, its connections to the primary circuit being thus in the open.

Other particulars of the motor constructed in accordance with the invention will be seen from the description which will follow, given with reference to the attached drawings, in which.

Figure 1:
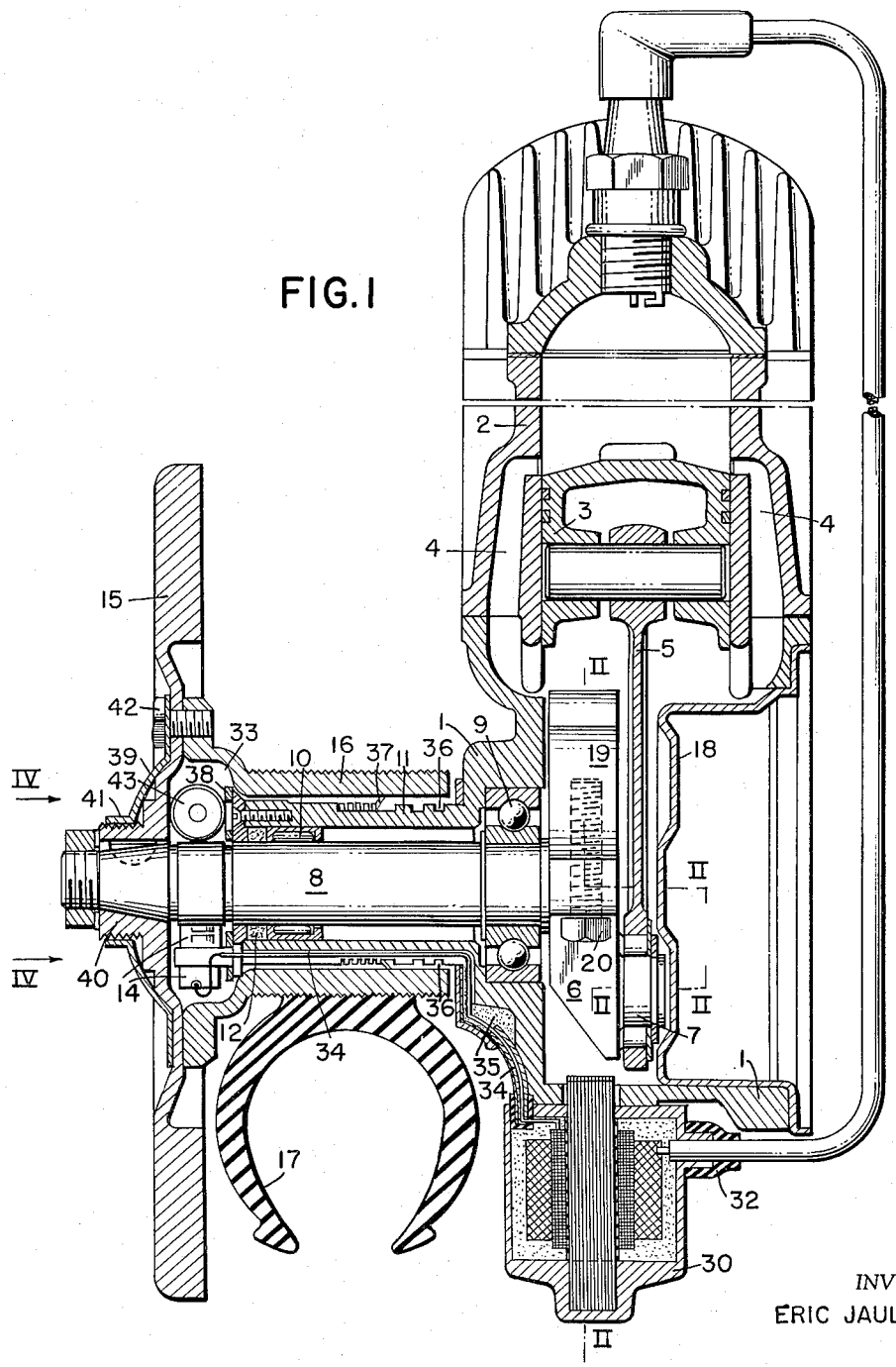
FIGURE 1 is a view of the entire engine, in vertical longitudinal section.

In FIGURE 1, 1 indicates the casing of the motor, and 2 its cylinder, in which moves the piston 3.

The transfer ports are shown at 4, and the connecting rod at 5. It is seen that the crank is reduced to a simple disc 6 carrying the pin 7. The shaft 8 is supported by the main ball bearing 9 near to the crank and by the auxiliary needle bearing 10, at its outside end, this bearing, carried at the end of a cylindrical extension 11 of the casing 1, being possibly replaced by a plain bearing. The single tightening joint for the casing is shown at 12. Beyond it, the shaft 8 carries the contact breaker 14 and then the flywheel 15, to which is connected the friction roller 16 which covers the extension 11 of the casing and which drives the tire 17 of the driving wheel.

It will be seen that the casing 1, at the opposite end to the extension 11, does not have any exit for the shaft, and can therefore be enclosed by the simple cover 18. The latter penetrates deeply into the interior of the casing as far as the immediate proximity of the crank in order to reduce the dead space as far as possible.

The construction of the casing 1 in a single piece avoids the machining of joining surfaces of the usual half-casings, their assembly and their alignment. Furthermore, the cross sections of the casing increase from the extension 11, through the housing for the ball bearing 9, as far as the circular flange for fixing the cover 18. It is thus simple to mold. The cover 18, once removed, gives free access to the crank mechanism.

The electrical equipment constitutes another of the original characteristics of the motor in accordance with the invention.

In the first place, the permanent magnet is mounted in the crank. More particularly (see FIGURES 2 and 3), it is integral with a balance weight 19, in the form of a segment of a circle, consisting of a non-magnetic metal and assembled on the crank proper by means of screws 20. As shown by FIGURE 3, the core of this magnet is formed by a mass of magnetic ceramic 21, of which the two external faces are of opposite polarity, the magnetic field of this magnet being thus directed along the axis of the crank. The pole pieces are constructed in the form of plates 22, 23 giving rise to staggered polar projections 24, 25 reaching the periphery of the balance weight 19 and bending the field to make it tangential to the periphery of the latter.

In one constructional variation, the magnet may have a metal core, creating a field which is transverse to the axis of the crankshaft. Pole pieces of appropriate form will deflect this field towards the exterior of this balance weight as above.

Figure 2:
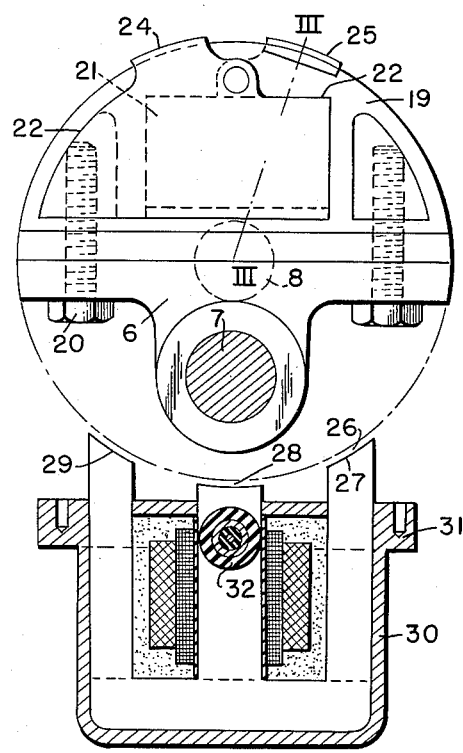
FIGURE 2 is a partial view taken on the line II—II of FIGURE 1.
Figure 3:
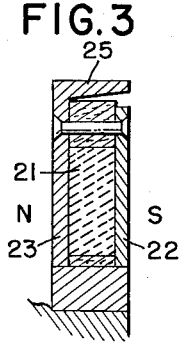
FIGURE 3 is a longitudinal partial section along the line III—III in FIGURE 2.

The air gap 26 is established, in accordance with the invention, between the projections 24, 25 and the extremities 27, 28, 29 of the cores of the ignition coil, seated in the closed housing 30 (see FIGURE 2). These ends reach to the internal cylindrical face of the casing 1, passing through a window made in the wall of the casing. The housing 30 of the coils form a tight fixing flange on the casing. 32 indicates an electrical connection from the coils to the spark plug.

In one variation of construction, the cores 27, 28 and 29, which are shorter, may also be prolonged by corresponding blocks incorporated in the wall of the casing.

Since the electric generator for ignition is thus incorporated in the casing of the motor, the contact breaker 14 as well as the condenser 43 is distinctly separated from it, in contrast to the state of affairs in motors comprising a normal flywheel magneto.

Figure 4:
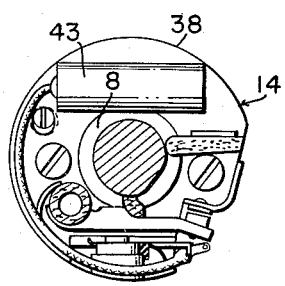
FIGURE 4 represents the contact breaker alone seen from the front along the arrows IV—IV of FIGURE 1.

In the constructional form chosen here, as for example, the breaker 14 (see FIGURE 4) is mounted on the end of the shaft 8, and beyond the tight joint 12, so as to make it easily accessible on the outside. It is situated in a recess 33 formed in part by the flywheel 15 and in part by the base of the friction roller 16.

The electrical connection between the ignition coil 30 and the breaker 14 is provided, in accordance with the invention, by a small plate 34 which penetrates to the base of the extension 11 of the casing, traversing a groove lined with insulating material, to ensure the tightness at this point of entry. The little plate 34 then follows a cut across the baffles 36 formed at the base of the extension 11 to oppose the entry of dust and mud beneath the friction roller 16 and passes then under the elastic ring 37 which ensures an efficient joint between the exterior of the extension 11 and the interior of the roller 16, before ending at the breaker 14.

In using the same annular air gap 26, and according to the invention, one may dispose one or more other coils such as 30 on the casing 1, to the appropriate angular positions, to light the vehicle for example.

It is a consequence of operation of the motor according to the invention such that, if the diameter of the contact breaker is greater than that of the interior of the tubular friction roller, it will be damaged in dismantling the flywheel still assembled with the roller 16. For this reason, there is provided the following safety device, easily seen in FIGURE 1.

The breaker 14 comprises a shoulder 38 and a cover of thin sheet metal 39 covers the hub 40 of the flywheel 15, thus masking its external thread 41 on which a detachable wheel remover may be engaged. The cover 39 is fixed to the flywheel by the same screws 42 which already serve to assemble the friction roller 16 to the flywheel.

Thus, before placing the wheel remover it is necessary to free the screws 42 to remove the cover 39, and at the same time detaching from the flywheel the roller 16.

One may then demount the contact breaker 14, and finally withdraw the roller 16.

It is evident that numerous details of constructions could be modified in a motor made as described and shown here by way of example solely, without thereby leaving the scope of the invention.

I claim:

1. An internal combustion engine comprising a casing, a crank therein having a crank arm and being connected to a shaft, a current generator having coils and mounted on the periphery of said casing adjacent said crank, a single permanent magnet housed in a balance weight located on said crank, said shaft having a flywheel thereon remote from said crank, and a contact breaker mounted within said flywheel.

2. An engine according to claim 1, in which pole pieces of the permanent magnet extend to the external periphery of the balance weight of the crank to create on rotation of the crank an annular air gap, and cores of said coils extending to the internal wall of said casing.

3. An engine according to claim 2, in which the cores of the coils traverse the wall of the casing through an opening in the wall of the latter.

4. An engine according to claim 2, in which the cores of the coils correspond to blocks incorporated in the wall of the casing.

5. An engine according to claim 1, further comprising a driving frictional roller adjacent said flywheel, the contact breaker being housed in a recess formed between the flywheel and a sleeve forming said friction roller.

6. An internal combustion engine comprising a casing having on one side only a tubular extension forming at its base a seat for a main bearing, a crank in said casing having a crank arm and being connected to a shaft, said main bearing supporting said shaft near the crank and said extension carrying at its free end an auxiliary bearing for said shaft, a current generator having coils and mounted on the periphery of said casing adjacent said crank, a single permanent magnet housed in a balance weight located on said crank, said shaft having a flywheel thereon remote from said crank, and a contact breaker mounted within said flywheel.

7. An engine according to claim 6, in which the face of the casing, opposite to the tubular extension for the shaft, is widely open and has therein a thin cover penetrating into the interior of the casing, to thereby reduce its dead space.

8. An engine according to claim 6, the casing being a single piece and successively increasing in cross section from its extension to its opposite opening.

9. An engine according to claim 6 and having a driving frictional roller adapted to engage the tire of a vehicle, said roller being connected to the flywheel end of the shaft and forming a sleeve covering the extension of the casing.

10. An engine according to claim 9, in which baffles and an elastic joint carried by the tubular extension of the casing successively oppose the penetration of dust and mud between this extension and the sleeve which forms the driving frictional roller.

11. An engine in accordance with claim 9, said shaft being threaded at the free end thereof, said flywheel carried by said shaft inwardly of its free end, said contact breaker being mounted on said shaft inwardly of said flywheel and having a diameter greater than said roller, said roller having an enlarged diameter to receive said contact breaker, a flange on said roller abutting said flywheel, a cover for said threads extending outwardly and abutting said flywheel oppositely to said roller flange, and a series of screws securing said cover and said roller to said flywheel.

References Cited in the file of this patent

FOREIGN PATENTS

| | | |
|---|---|---|
| 496,250 | Italy | July 9, 1954 |
| 778,296 | Great Britain | July 3, 1957 |